(No Model.)

H. DAVIDSON & H. HART.
ROD COUPLING OR JOINT.

No. 432,695.  Patented July 22, 1890.

Witnesses.
G. F. Redfern
B. Brady

Inventors.
Henry Davidson
Herman Hart

United States Patent Office.

HENRY DAVIDSON AND HERMAN HART, OF LONDON, ENGLAND; SAID HART ASSIGNOR TO SAID DAVIDSON.

ROD COUPLING OR JOINT.

SPECIFICATION forming part of Letters Patent No. 432,695, dated July 22, 1890.

Application filed April 7, 1890. Serial No. 346,893. (No model.) Patented in England November 4, 1885, No. 13,325.

*To all whom it may concern:*

Be it known that we, HENRY DAVIDSON and HERMAN HART, subjects of the Queen of Great Britain, residing at London, England, have invented new and useful Improvements in Rod Couplings or Joints, (for which we have obtained a patent in Great Britain, No. 13,325, dated November 4, 1885,) of which the following is a specification.

This invention relates to an improved socket coupling or joint for rods of all kinds, canes, and the like.

In order to enable our invention to be fully understood, we will describe how it can be carried into practice by reference to the accompanying drawings, in which—

Figure 1:
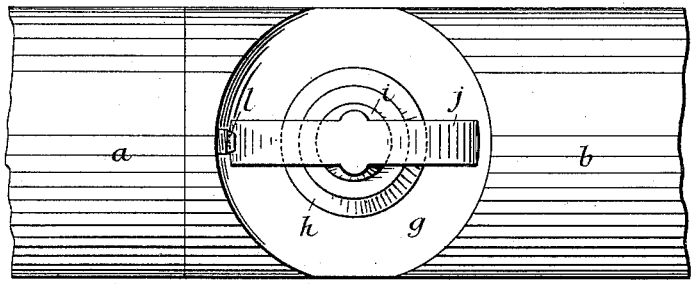
Figure 6:
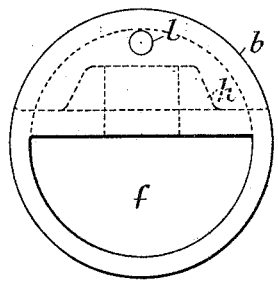
Figure 2:
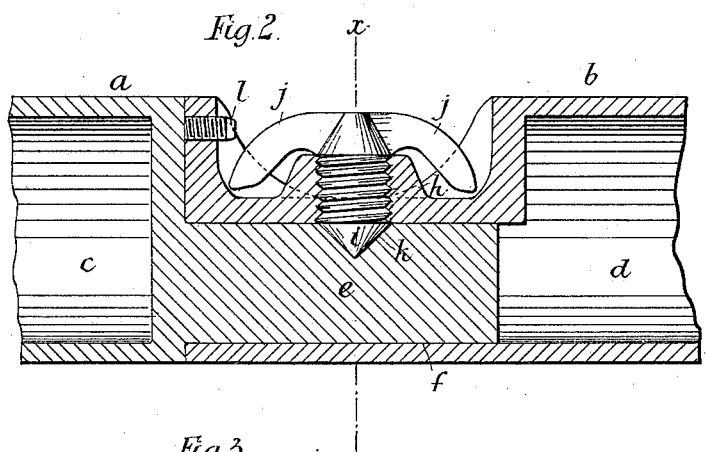
Figure 5:
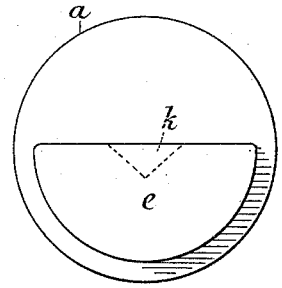
Figure 3:
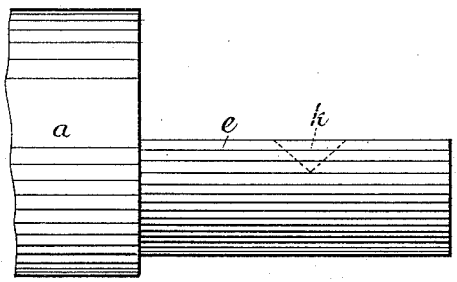
Figure 4:
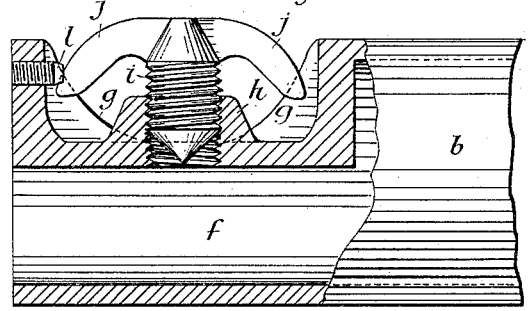
Figure 7:
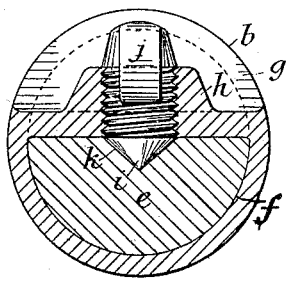

Figure 1 represents a plan of our improved socket coupling or joint suitable for connecting together the several lengths of a ramrod or the like. Fig. 2 is a longitudinal section of the same. Figs. 3 and 4 are views showing the end portions of the two parts of the coupling or joint. Figs. 5 and 6 are end views, respectively, of the parts shown in Figs. 3 and 4. Fig. 7 is a section on line $x$ $x$ of Fig. 2.

Our improved joint is made of suitable metal and in two parts $a$ and $b$, as shown in Figs. 2, 3, and 4, one end of each part being made tubular, so as to form a socket, (marked $c$ and $d$, respectively,) into which sockets are fitted the ends of the rods or parts of a rod to be coupled or connected together. The other end of the part $a$ is formed with a semi-cylindrical or D-shaped projection $e$, adapted to fit into a correspondingly-shaped socket $f$ in the end of the other part $b$ of the coupling. The part $b$ of the coupling over the socket $f$ is recessed, as shown at $g$. In the center of the recess $g$ is a boss $h$, cut with a female screw-thread, in which is placed a set-screw $i$, provided with a wing-head $j$.

$k$ is a conical recess in the projection $e$, and when the parts of the joint are coupled together, by passing the projection $e$ into the socket $f$, they can be held firmly in their coupled position by the set-screw $i$, the pointed end of which passes into the recess $k$ in the projection $e$, as clearly shown in Figs. 2 and 7.

$l$ is a stop to prevent the set-screw $i$ from becoming detached by limiting the extent to which it can be unscrewed.

We thus provide a simple and efficient rod-coupling, the parts of which can be easily coupled and uncoupled and be fastened firmly together or unfastened by simply giving the screw $i$ a few turns. At the same time the screw $i$ is prevented from becoming detached, and when the parts are closed there are no projections, the top of the screw being flush with or below the surface of the coupling. It will also be obvious that when the parts of our coupling are placed together one part cannot turn round without the other part.

Having now particularly described and ascertained the nature of our said invention and in what manner the same is to be performed, we declare that what we claim is—

1. A rod coupling or joint consisting of two parts, one part having a semi-cylindrical or D-shaped projection adapted to fit into a correspondingly-shaped socket in the other part, whereby one part is prevented from turning without the other part, the two parts being fastened by means of a set-screw, substantially as described, and illustrated in the accompanying drawings.

2. In a rod coupling or joint of the kind hereinbefore described, one part of the coupling provided with a recess to receive the head of a set-screw, and a stop in said recess to prevent the set-screw becoming detached, substantially as described.

HENRY DAVIDSON.
HERMAN HART.

Witnesses:
G. F. REDFERN,
*Patent Agent, 4 South St., Finsbury, London.*
B. BRADY.